United States Patent
Sato et al.

(10) Patent No.: US 9,618,081 B2
(45) Date of Patent: Apr. 11, 2017

(54) SILENT CHAIN AND SILENT CHAIN TRANSMISSION DEVICE

(71) Applicant: TSUBAKIMOTO CHAIN CO., Osaka-shi, Osaka (JP)

(72) Inventors: Toshifumi Sato, Osaka (JP); Takeo Sasaki, Osaka (JP); Shuji Hamaguchi, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 0 days.

(21) Appl. No.: 14/790,294

(22) Filed: Jul. 2, 2015

(65) Prior Publication Data

US 2016/0040750 A1 Feb. 11, 2016

(30) Foreign Application Priority Data

Aug. 6, 2014 (JP) .................................. 2014-160841

(51) Int. Cl.
*F16G 13/04* (2006.01)
*F16G 13/08* (2006.01)

(52) U.S. Cl.
CPC ............. *F16G 13/04* (2013.01); *F16G 13/08* (2013.01)

(58) Field of Classification Search
CPC . F16G 13/04; F16G 5/18; F16G 13/08; F16H 9/24; B21L 15/005
USPC ........................................................ 474/215
See application file for complete search history.

(56) References Cited

U.S. PATENT DOCUMENTS

| | | | | |
|---|---|---|---|---|
| 2,653,485 A | * | 9/1953 | MacArthur | F16G 13/04 474/215 |
| 3,213,699 A | * | 10/1965 | Terepin | F16G 13/04 474/215 |
| 3,742,776 A | * | 7/1973 | Avramidis | F16G 13/04 474/215 |
| 4,345,904 A | * | 8/1982 | Numazawa | F16G 13/04 474/215 |
| 4,764,158 A | * | 8/1988 | Honda | F16G 5/18 474/212 |
| 4,801,289 A | * | 1/1989 | Sugimoto | F16H 9/24 474/215 |
| 5,236,399 A | * | 8/1993 | Sugimoto | F16G 13/04 474/215 |
| 5,372,554 A | * | 12/1994 | Okuda | F16G 13/04 474/206 |
| 6,572,503 B2 | * | 6/2003 | Horie | F16G 13/04 474/212 |

(Continued)

FOREIGN PATENT DOCUMENTS

JP 2002-130384 A 5/2002

*Primary Examiner* — Henry Liu
(74) *Attorney, Agent, or Firm* — Westerman, Hattori, Daniels & Adrian, LLP

(57) ABSTRACT

An object of the present invention is to provide a silent chain and a silent chain transmission device which stabilize chain behavior during chain travel to suppress an occurrence of tooth skipping and to reduce a string vibration sound and a meshing noise with simple configurations. In a silent chain 110, a pin hole 161 of an inner plate 160 and a pair of locker pins 170 are configured in such a size that a gap is formed between a seat surface 163 and a back surface of a short pin 172 in a state where the pair of locker pins 170 are in contact with each other on rolling surfaces 171a and 172a.

7 Claims, 4 Drawing Sheets

(56) References Cited

U.S. PATENT DOCUMENTS

| | | | | |
|---|---|---|---|---|
| 6,589,127 B1* | 7/2003 | Horie | B21L 15/005 | 474/212 |
| 6,811,507 B2* | 11/2004 | Baumann | B21L 15/005 | 148/206 |
| 7,179,184 B2* | 2/2007 | Linnenbrugger | F16G 13/06 | 229/207 |
| 7,857,722 B2* | 12/2010 | Simonov | F16G 13/04 | 474/215 |
| 8,012,054 B2* | 9/2011 | Morimoto | F16G 13/04 | 474/215 |
| 8,038,559 B2* | 10/2011 | Tada | F16G 5/18 | 474/155 |
| 8,337,348 B2* | 12/2012 | Kabai | F16G 13/04 | 474/207 |
| 8,485,928 B2* | 7/2013 | Adachi | F16G 13/08 | 474/215 |
| 8,998,758 B2* | 4/2015 | Hamaguchi | F16G 13/08 | 474/212 |
| 8,998,759 B2* | 4/2015 | Hamaguchi | F16G 13/04 | 474/215 |
| 2002/0072444 A1* | 6/2002 | Matsuno | F16G 13/04 | 474/215 |
| 2007/0010363 A1* | 1/2007 | Pichura | F16G 13/04 | 474/215 |
| 2007/0155564 A1* | 7/2007 | Ledvina | F16G 13/04 | 474/215 |
| 2007/0191165 A1* | 8/2007 | Junig | F16G 13/04 | 474/215 |
| 2007/0197329 A1* | 8/2007 | Simonov | F16G 13/04 | 474/215 |
| 2008/0020884 A1* | 1/2008 | Simonov | F16G 13/04 | 474/215 |
| 2008/0139356 A1* | 6/2008 | Teubert | F16G 5/18 | 474/215 |
| 2010/0216580 A1* | 8/2010 | Kabai | F16G 13/04 | 474/207 |
| 2011/0065542 A1* | 3/2011 | Adachi | F16G 13/04 | 474/215 |
| 2013/0165285 A1* | 6/2013 | Hamaguchi | F16G 13/04 | 474/215 |
| 2013/0260934 A1* | 10/2013 | Hamaguchi | F16G 13/04 | 474/215 |

* cited by examiner

| | LOW LOAD REGION | HIGH LOAD REGION | HIGH LOAD REGION WHEN ELASTICALLY ELONGATED |
|---|---|---|---|
| GUIDE ROW | I = S | I ≧ S | I ≧ S |
| NON-GUIDE ROW | I = S | I ≧ S | I > S |

I: PITCH BETWEEN ROLLING POINTS
S: SPROCKET PITCH

| | LOW LOAD REGION | HIGH LOAD REGION | HIGH LOAD REGION WHEN ELASTICALLY ELONGATED |
|---|---|---|---|
| GUIDE ROW | I ≦ S | I ≦ S | I ≦ S |
| NON-GUIDE ROW | I < S | I ≦ S | I ≧ S |

I: PITCH BETWEEN ROLLING POINTS
S: SPROCKET PITCH

SILENT CHAIN AND SILENT CHAIN TRANSMISSION DEVICE

BACKGROUND OF THE INVENTION

1. Field of the Invention

The present invention relates to a silent chain and a silent chain transmission device made up of the silent chain and a sprocket.

2. Description of the Related Art

Conventionally, a silent chain is known in which a guide row made up of a pair of left and right guide plates and a middle plate disposed between the pair of left and right guide plates and a non-guide row made up of a plurality of inner plates are alternately connected in a chain longitudinal direction by a pair of locker pins made up of a long pin and a short pin to be inserted into a pair of front and rear pin holes provided on the middle plate and the inner plates (for example, refer to Japanese Patent Application Laid-open No. 2002-130384).

In addition, a silent chain transmission device is known which is capable of transmitting power among a plurality of sprockets by winding a silent chain around the plurality of sprockets.

Generally, in a silent chain transmission device made up of a silent chain and a sprocket, a sprocket pitch is defined as an interval between intersections of a standard pitch line of the sprocket and an imaginary line that passes through respective tooth bottoms.

In addition, a tooth shape of the sprocket and shapes of the respective plates of the silent chain are designed so that the silent chain can be wound around the sprocket in an optimal manner in a state where a pitch between rolling points that is an interval between rolling points of a pair of locker pins inserted into respective pin holes of the silent chain is consistent with the sprocket pitch.

Presupposing the occurrence of elastic elongation and wear elongation, a known silent chain such as that described in Japanese Patent Application Laid-open No. 2002-130384 is designed such that a pitch between rolling points in at least a non-guide row is smaller than a sprocket pitch in a low load state where the silent chain is subjected to such a load that elastic elongation hardly occurs as shown in the table in FIG. 7.

This design takes into consideration that, when elastic elongation and wear elongation occur during actual use, a difference between the sprocket pitch and the pitch between rolling points decreases and winding of the silent chain around the sprocket improves.

SUMMARY OF THE INVENTION

However, when a pitch relationship is set as described above, since the pitch between rolling points in at least the non-guide row becomes shorter than the sprocket pitch in the silent chain that is wound around the sprocket in an initial state and a low load state where wear elongation has not occurred, winding around the sprocket loosens.

As a result, a problem occurs where, due to unstable chain behavior, a string vibration sound of the silent chain becomes louder and a meshing noise between the silent chain and the sprockets worsens.

In addition, even when a high load that causes elastic elongation is applied to the silent chain, there is a region where the silent chain is wound without being subject to tension from the sprocket or, in other words, a region where the silent chain is wound around the sprocket by the weight of the silent chain as well as in a region where a load acting on the silent chain decreases on the sprocket. In such regions, since the pitch between rolling points in at least the non-guide row becomes shorter than the sprocket pitch and, similarly, winding of the silent chain around the sprocket loosens and chain behavior is not stable, there is a problem that a string vibration sound of the silent chain becomes louder and a meshing noise between the silent chain and the sprockets worsens.

Furthermore, in a high load region where the silent chain is wound while being subject to tension from the sprocket, a force is applied in a direction in which the pitch between rolling points decreases due to strong elasticity and generates a force in a direction in which the silent chain detaches from the teeth of the sprocket. This makes it easier for link teeth of the inner plate to run on the sprocket teeth and creates a risk of so-called tooth skipping.

Moreover, even in the guide row, presupposing the occurrence of elongation of the silent chain, since the pitch between rolling points is set equal to or shorter than the sprocket pitch in a low load state so as to improve winding of the silent chain around the sprocket when elongation occurs as shown in the table in FIG. 5, there is a similar problem to that of the non-guide row described above.

To describe the "pitch between rolling points" and the "sprocket pitch" discussed above in greater detail, the "pitch between rolling points" refers to an interval between pin rolling points that are adjacent to each other in a chain longitudinal direction, a pin rolling point being a point where rolling surfaces of a pair of locker pins inserted into pin holes of a middle plate and an inner plate abut against each other in a state where the silent chain is wound around the sprocket in a low load state.

In addition, the "sprocket pitch" refers to an interval between imaginary intersections that are adjacent to each other in the chain longitudinal direction, an imaginary intersection being an intersection of a pitch line which passes through each pin rolling point and which extends in the chain longitudinal direction and an imaginary line which passes through a center of rotation of the sprocket and each tooth bottom of the sprocket.

The present invention solves these problems and an object thereof is to provide a silent chain and a silent chain transmission device which stabilize chain behavior during chain travel to suppress an occurrence of tooth skipping and which reduce a string vibration sound and a meshing noise with simple configurations.

A silent chain according to the present invention solves the problems described above by being configured as a silent chain in which a guide row made up of a pair of left and right guide plates and a middle plate disposed between the pair of left and right guide plates and a non-guide row made up of a plurality of inner plates are alternately connected in a chain longitudinal direction by a pair of locker pins made up of a long pin and a short pin to be inserted into a pair of front and rear pin holes provided on the middle plate and the inner plates, wherein each locker pin includes a back surface and a rolling surface, the pin holes of the inner plates each include a seat surface which is formed on the outer side in the chain longitudinal direction and to which the back surface of the short pin is seated to restrict pin attitude, and the pin holes of the inner plates and the pair of locker pins are formed in such a size that a gap is formed between the seat surface of the inner plates and the back surface of the short pin in a state where the pair of locker pins are in contact with each other on the rolling surfaces.

A silent chain transmission device according to the present invention solves the problems described above by being configured as a silent chain transmission device including the silent chain described above and a sprocket, wherein a pitch between rolling points of locker pins of the front and rear pin holes of the non-guide row is set equal to or longer than a sprocket pitch in a state where the silent chain is wound around the sprocket under a low load.

With the silent chain according to claim 1, due to the pin holes of the inner plates and the pair of locker pins being configured in such a size that a gap is formed between the seat surface of the inner plates and the back surface of the short pin in a state where the pair of locker pins are in contact with each other on the rolling surfaces, in a state where a large tension in the chain longitudinal direction is not applied, the pair of locker pins becomes movable in the chain longitudinal direction inside the pinholes of the inner plates and a pitch of the non-guide row becomes variable in correspondence with an amount of movement.

Accordingly, even when elastic elongation or wear elongation occurs in the silent chain and the pitch between rolling points of the non-guide row increases, in a region where the silent chain is wound without being subject to tension from the sprocket or, in other words, a region where the silent chain is wound around the sprocket by the weight of the silent chain as well as in a region where a load acting on the silent chain decreases on the sprocket, the pair of locker pins moves in the chain longitudinal direction inside the pin holes of the inner plates of the non-guide row in correspondence to the sprocket pitch, and winding around the sprocket can be kept at a favorable level.

As a result, chain behavior during chain travel can be stabilized, an occurrence of tooth skipping can be suppressed, and a string vibration sound and a meshing noise can be reduced.

In addition, the pitch between rolling points of the silent chain in an initial state and a low load state where wear elongation has not occurred can be set equal to or longer than the sprocket pitch.

With the configuration according to present claim 2, due to the pin holes of the middle plate and the pair of locker pins being configured in such a size that a gap is formed between the seat surface of the middle plate and the back surface of the long pin in a state where the pair of locker pins are in contact with each other on the rolling surfaces, the middle plate becomes movable in the chain longitudinal direction in the guide row.

Accordingly, even when elastic elongation or wear elongation occurs in the silent chain and the pitch between rolling points of the guide row increases, in a region where the silent chain is wound without being subject to tension from the sprocket or, in other words, a region where the silent chain is wound around the sprocket by the weight of the silent chain as well as in a region where a load acting on the silent chain decreases on the sprocket, the middle plate moves to an optimal position and winding around the sprocket can be kept at a favorable level.

As a result, chain behavior during chain travel can be further stabilized, an occurrence of tooth skipping can be suppressed, and a string vibration sound and a meshing noise can be reduced.

With the configuration according to present claim 3, due to the thickness of the short pin of the pair of locker pins in the chain longitudinal direction being different from the thickness of the long pin in the chain longitudinal direction, the pitch between rolling points can set equal to the sprocket pitch without having to change the pin holes of the respective plates from conventional pin holes.

With the configuration according to present claim 4, due to the diameter of the pin holes of the middle plate and the inner plates in the chain longitudinal direction being larger than a diameter of the pin holes thereof in a chain height direction, an occurrence of a gap in a chain height direction between the pin holes and the locker pins can be reduced when the pair of locker pins moves in the chain longitudinal direction in the pin holes of the inner plates and when the middle plate moves in the chain longitudinal direction in the guide row.

As a result, backlash of the middle plate and the inner plates in the chain height direction decreases, chain behavior during chain travel can be further stabilized, an occurrence of tooth skipping can be suppressed, and a string vibration sound and a meshing noise can be reduced.

With the silent chain transmission device according to claim 5, due to the pitch between rolling points of locker pins of the front and rear pin holes of the non-guide row being set equal to or longer than a sprocket pitch in a state where the silent chain is wound around the sprocket under a low load, the pitch between rolling points in the non-guide row becomes equal to the sprocket pitch when the silent chain is in an initial state and a low load state.

Accordingly, winding of the silent chain around the sprocket is improved, chain behavior during chain travel becomes stable, and a string vibration sound and a meshing noise of the silent chain can be reduced.

In addition, even when a high load is applied to the silent chain or wear elongation occurs in the silent chain, the pitch between rolling points in the non-guide row becomes equal to the sprocket pitch in a region where the silent chain is wound without being subject to tension from the sprocket or, in other words, a region where the silent chain is wound around the sprocket by the weight of the silent chain as well as in a region where a load acting on the silent chain decreases on the sprocket.

Accordingly, winding of the silent chain around the sprocket is improved, chain behavior during chain travel becomes stable, a string vibration sound and a meshing noise of the silent chain can be reduced, and an occurrence of tooth skipping can be suppressed even in a high load region where the silent chain is wound while being subject to tension from the sprocket.

With the configuration according to present claim 6, due to the pitch between rolling points in the guide row being set equal to the sprocket pitch in a state where the silent chain is wound around the sprockets under a low load, the pitch between rolling points in the guide row becomes equal to the sprocket pitch when the silent chain is in an initial state and a low load state.

Accordingly, a similar effect to that of the non-guide row is also created in the guide row, causing winding of the silent chain around the sprocket to be improved in the silent chain as a whole, chain behavior during chain travel to be stable, a string vibration sound and a meshing noise of the silent chain to be reduced, and an occurrence of tooth skipping to be suppressed even in a high load region where the silent chain is wound while being subject to tension from the sprocket.

With the configuration according to present claim 7, due to the positions of the front and rear pin holes of the non-guide row being different from positions of the front and rear pin holes of the guide row, the pitch between rolling points of the locker pins of the front and rear pin holes of the non-guide row can be set equal to the sprocket pitch without having to change the pair of locker pins, the guide plates, and the middle plate from those that are conventional.

With the configuration according to present claim 8, due to the pitch between rolling points being different between the guide row and the non-guide row, a timing and a position of contact with the sprocket changes between the middle plate and the inner plates. As a result, periodic noise and vibration are suppressed and, furthermore, a string vibration sound and a meshing noise can be reduced.

DESCRIPTION OF THE PREFERRED EMBODIMENTS

A silent chain according to the present invention is a silent chain in which a guide row made up of a pair of left and right guide plates and a middle plate disposed between the pair of left and right guide plates and a non-guide row made up of a plurality of inner plates are alternately connected in a chain longitudinal direction by a pair of locker pins made up of a long pin and a short pin to be inserted into a pair of front and rear pin holes provided on the middle plate and the inner plates, wherein each locker pin includes a back surface and a rolling surface, and the pin holes of the inner plates each include a seat surface which is formed on the outer side in the chain longitudinal direction and to which the back surface of the short pin is seated to restrict pin attitude. The silent chain can assume any specific embodiment as long as the silent chain stabilizes chain behavior during chain travel, suppresses an occurrence of tooth skipping, and reduces a string vibration sound and a meshing noise with a simple configuration.

In addition, a silent chain transmission device according to the present invention is a silent chain transmission device made up of the silent chain described above and a sprocket, wherein the silent chain is configured such that a guide row made up of a pair of left and right guide plates and a middle plate disposed between the pair of left and right guide plates and a non-guide row made up of a plurality of inner plates are alternately connected in a chain longitudinal direction by a pair of locker pins made up of a long pin and a short pin to be inserted into a pair of front and rear pin holes provided on the middle plate and the inner plates, and a pitch between rolling points of locker pins of the front and rear pin holes of the non-guide row is set equal to or longer than a sprocket pitch in a state where the silent chain is wound around the sprocket under a low load. The silent chain transmission device can assume any specific embodiment as long as the silent chain transmission device stabilizes chain behavior during chain travel, suppresses an occurrence of tooth skipping, and reduces a string vibration sound and a meshing noise with a simple configuration.

Any specific material may be used for the respective components of the silent chain according to the present invention as long as the material has sufficient strength to maintain tension of the chain at a proper level. From the perspectives of strength, workability, and economic efficiency, an iron-based material such as steel and cast iron is favorably used. In particular, the guide plates, the middle plate, and the inner plates are favorably formed by punching out steel plates.

Hereinafter, a silent chain according to an embodiment of the present invention will be described with reference to the drawings.

First Embodiment

Figure 1:
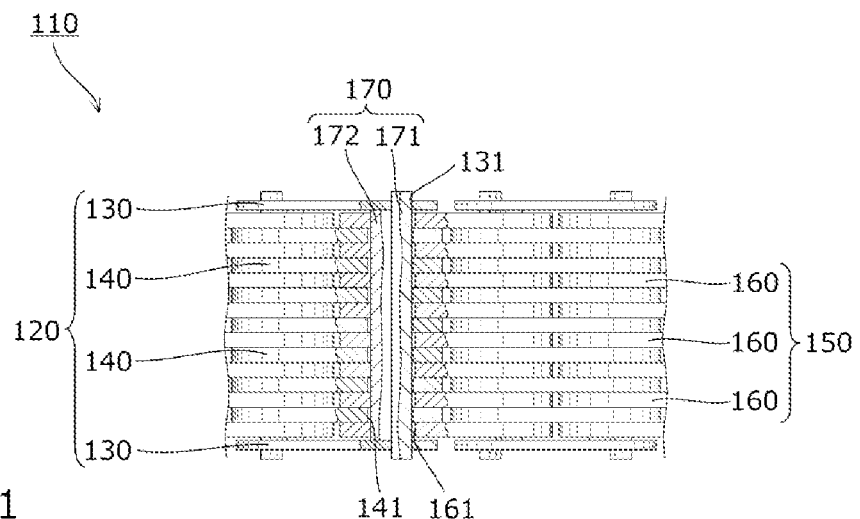
FIG. 1 is a sectional explanatory diagram of a silent chain according to a first embodiment of the present invention.
Figure 2:
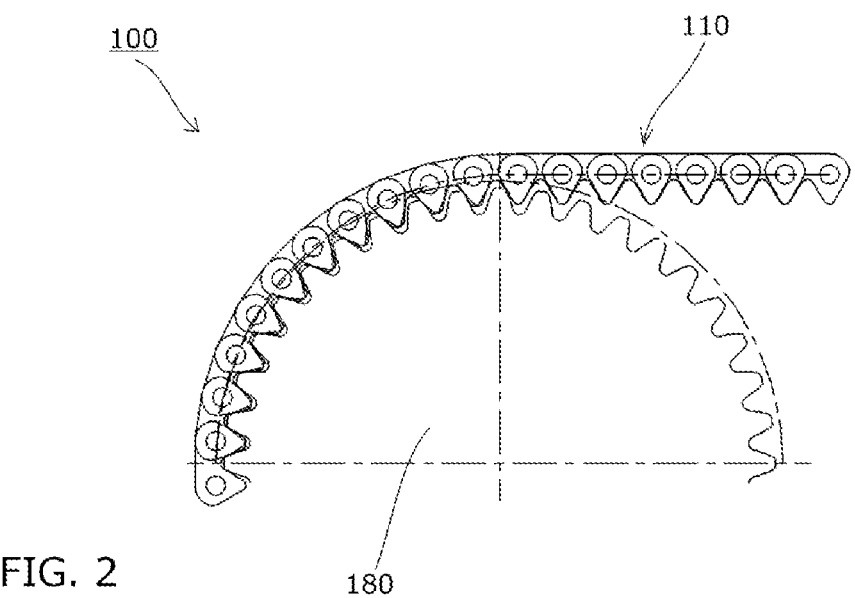
FIG. 2 is a partial side view of a silent chain transmission device according to the first embodiment of the present invention.

As shown in FIG. 1, in a silent chain 110 according to a first embodiment of the present invention, a plurality of guide rows 120 and a plurality of non-guide rows 150 are alternately arranged in a chain longitudinal direction while being staggered by half a pitch, and bendably connected by a pair of locker pins 170. As partially shown in FIG. 2, the silent chain 110 is wound around a sprocket 180 to constitute a silent chain transmission device 100 according to the first embodiment of the present invention.

The guide rows 120 of the silent chain 110 are made up of a pair of left and right guide plates 130 that are arranged on both outer sides in a chain width direction and a plurality of middle plates 140 that are arranged between the pair of left and right guide plates 130. In addition, the non-guide rows 150 are made up of a plurality of inner plates 160 that are arranged parallel to each other in the chain width direction.

The pair of locker pins 170 is made up of a long pin 171 and a short pin 172. While the long pin 171 and the short pin 172 are pins with a same shape and different lengths, in an alternative example, the long pin 171 and the short pin 172 may be pins with different sectional shapes on a plane that is perpendicular to the chain width direction.

The long pin 171 and the short pin 172 are inserted together into a pin hole 141 of the middle plate 140 and a pin hole 161 of the inner plate 160 in a loosely fitting state, and both ends of the long pin 171 are fixed to pin holding holes 131 of the guide plate 130.

Figure 3:
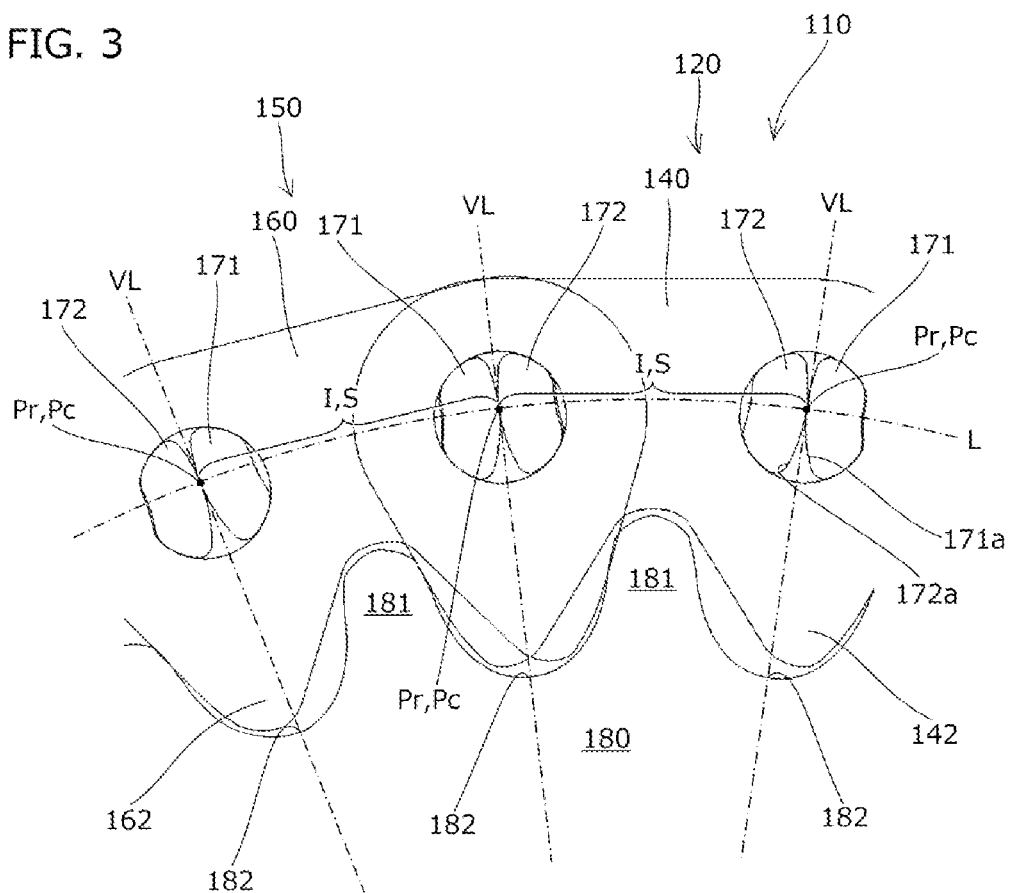
FIG. 3 is a relationship explanatory diagram of a silent chain and a sprocket according to the first embodiment of the present invention.

As shown in FIG. 3,4, the long pin 171 and the short pin 172 respectively include rolling surfaces 171a and 172a and a recessed back surface, and the pin hole 141 of the middle plate 140 and the pin hole 161 of the inner plate 160 include a projecting seat surface which is formed on an outer side in the chain longitudinal direction and which restricts pin attitude. The long pin 171 and the short pin 172 are inserted into the pin holes 141 and 161 in a state where the respective rolling surfaces 171a and 172a oppose each other and the respective back surfaces of the pins 171 and 172 are seated on the seat surfaces of the pin holes 141 and 161.

The middle plate 140 and the inner plate 160 respectively include a pair of V-shaped link teeth 142 and 162 to mesh with sprocket teeth 181 of the sprocket 180 on a sprocket meshing side.

Figures 4, 5:
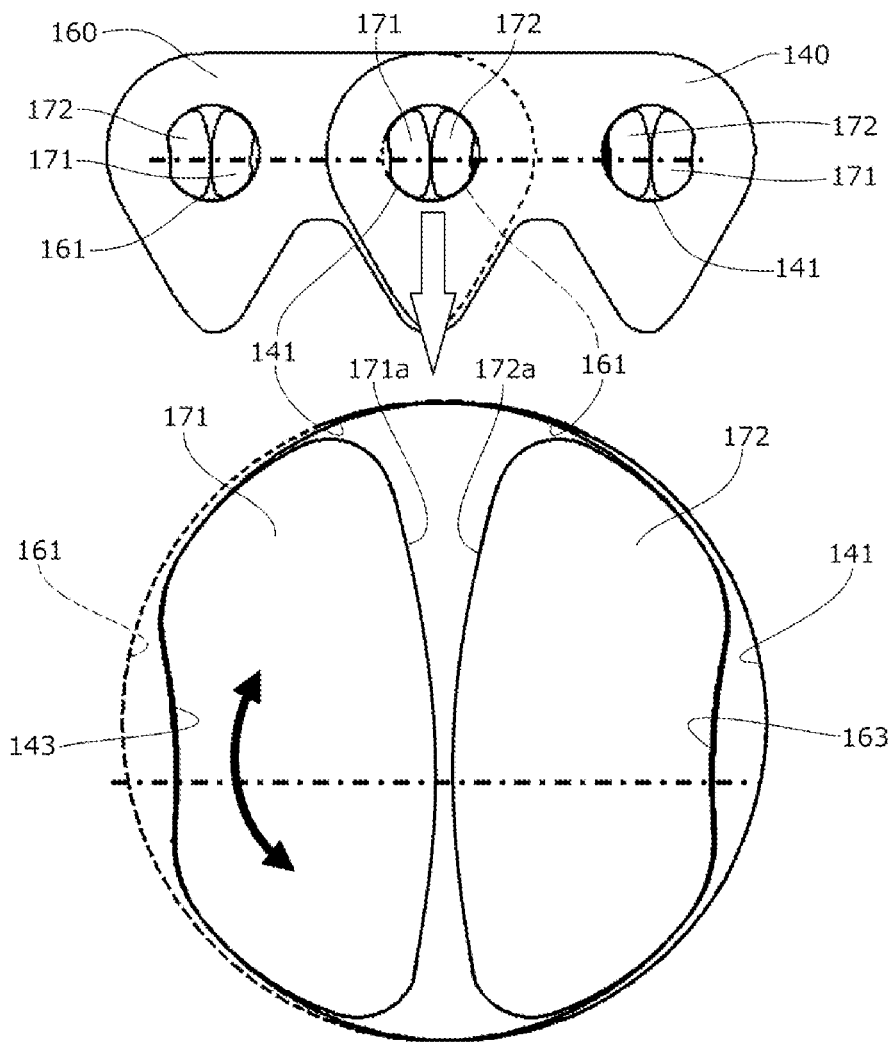
FIG. 4 is an enlarged view of a relationship between a pin hole and a locker pin of a silent chain according to the first embodiment of the present invention.
FIG. 5 is a relational table of respective pitches of a silent chain transmission device according to the first embodiment of the present invention.

In addition, as shown in FIG. 4, the pin hole 161 of the inner plate 160 includes a seat surface 163 which is formed on an outer side in the chain longitudinal direction and on which the back surface of the short pin 172 is seated to restrict pin attitude, and the pin hole 141 of the middle plate 140 includes a seat surface 143 which is formed on an outer side in the chain longitudinal direction and on which the back surface of the long pin 171 is seated to restrict pin attitude.

Furthermore, in a state where the pair of locker pins 171 and 172 are in contact with each other on the rolling surfaces 171a and 172a, the pin hole 161 of the inner plate 160 has a size that causes a gap to be created between the seat surface 163 of the inner plate 160 and the back surface of the short pin 172, and the pin hole 141 of the middle plate 140 has a size that causes a gap to be created between the seat surface 143 of the middle plate 140 and the back surface of the long pin 171.

In other words, as shown in FIG. 4, a configuration is adopted in which a gap is created between the rolling surfaces 171a and 172a in a state where the back surface of the short pin 172 is seated on the seat surface 163 of the inner plate 160 and the back surface of the long pin 171 is seated on the seat surface 143 of the middle plate 140.

Due to such a configuration, in a state where a large tension in the chain longitudinal direction is not applied, the short pin 172 becomes freely movable in the chain longitudinal direction by an amount corresponding to the gap, a pitch of the non-guide row becomes variable, and a position of the inner plate 160 in the chain longitudinal direction also becomes movable.

In addition, since a pitch of the guide row does not change because an interval of the long pins 171 of the guide row is fixed by the guide plates 130, a position of the middle plate 140 in the chain longitudinal direction becomes movable by an amount corresponding to the gap.

Therefore, even when a high load is applied to the silent chain or wear elongation occurs in the silent chain, in a region where the silent chain is wound around the sprocket due to weight or a region where a load acting on the silent chain decreases on the sprocket, winding of the silent chain around the sprocket is improved, chain behavior during chain travel becomes stable, and a string vibration sound and a meshing noise of the silent chain can be reduced.

Furthermore, a pitch between rolling points in an initial state and a low load state need not be set equal to or shorter than a sprocket pitch on the assumption that elongation is to occur and can be set so as to suppress an occurrence of tooth skipping in a high load region where the silent chain is wound while being subject to tension from the sprocket even in an initial state and a low load state.

A relationship between the pitch between rolling points and the sprocket pitch according to the present embodiment is set such that, in a state where the silent chain 110 is wound around the sprocket 180 in a low load state, the pitch between rolling points I in the guide row 120 and the non-guide row 150 is equal to the sprocket pitch S as shown in the table in FIG. 5.

In this case, as shown in FIG. 3, the pitch between rolling points I described above refers to an interval between pin rolling points Pr that are adjacent to each other in a chain longitudinal direction, a pin rolling point Pr being a rolling point between the pair of locker pins 170 inserted into the pin holes 141 and 161 of the middle plate 140 and the inner plate 160 in a state where the silent chain 110 is wound around the sprocket 180 in a low load state.

The sprocket pitch S described above refers to an interval between imaginary intersections Pc that are adjacent to each other in the chain longitudinal direction, an imaginary intersection Pc being an intersection of a pitch line L which passes through each pin rolling point Pr and which extends in the chain longitudinal direction and an imaginary line VL which passes through a center of rotation (not shown) of the sprocket 180 and each tooth bottom 182 of the sprocket 180.

By setting a pitch relationship among respective members of the silent chain transmission device 100 as described above, the pitch between rolling points I in the guide row 120 and the non-guide row 150 becomes equal to the sprocket pitch S when the silent chain 110 is in an initial state and a low load state, and even when a high load is applied to the silent chain 110 or when wear elongation occurs in the silent chain 110, the pitch between rolling points I becomes equal to the sprocket pitch S in a region where the silent chain 110 is wound around the sprocket 180 due to weight or a region where a load acting on the silent chain 110 decreases on the sprocket 180.

Specific relationships regarding dimensions and shapes that enable the dimensional relationship between pin holes and locker pins and the pitch relationship among respective members according to the present embodiment to be set as described above will now be listed.

In a first specific example, a size and a shape of the short pin 172 are adjusted to form the gap described above and to adjust a relationship between the pitch between rolling points I and the sprocket pitch S in the non-guide row 150.

In this case, the sprocket 180 which has a same configuration as a conventional sprocket can be used without modification, and parts of the silent chain 110 with the exception of the short pin 172 can also be used without modification.

In a second specific example, a size and a shape of at least one of the short pin 172 and the long pin are adjusted to form the gap described above, and a relationship between the pitch between rolling points I and the sprocket pitch S in the guide row 120 and the non-guide row 150 is adjusted by adjusting a tooth shape of the sprocket 180.

In this case, the silent chain 110 which has a same configuration as a conventional silent chain can be used without modification, and the relationship between the pitch between rolling points I and the sprocket pitch S can be adjusted for both the guide row 120 and the non-guide row 150.

In a third specific example, forms and positions of the pin holes 141 and 161 of the middle plate 140 and the inner plate 160 and formation positions of the pin holding holes 131 of the guide plate 130 are adjusted in order to form the gap described above and to adjust a relationship between the pitch between rolling points I and the sprocket pitch S in the guide row 120 and the non-guide row 150.

In this case, the sprocket 180 which has a same configuration as a conventional sprocket can be used without modification, and parts of the silent chain 110 with the exception of the plates 130, 140, and 160 can also be used without modification.

Moreover, the specific examples listed above may respectively be adopted independently or a plurality of the specific examples may be combined as appropriate. Alternatively, specific examples may be realized by configurations other than those described above.

Second Embodiment

Figures 6, 7:
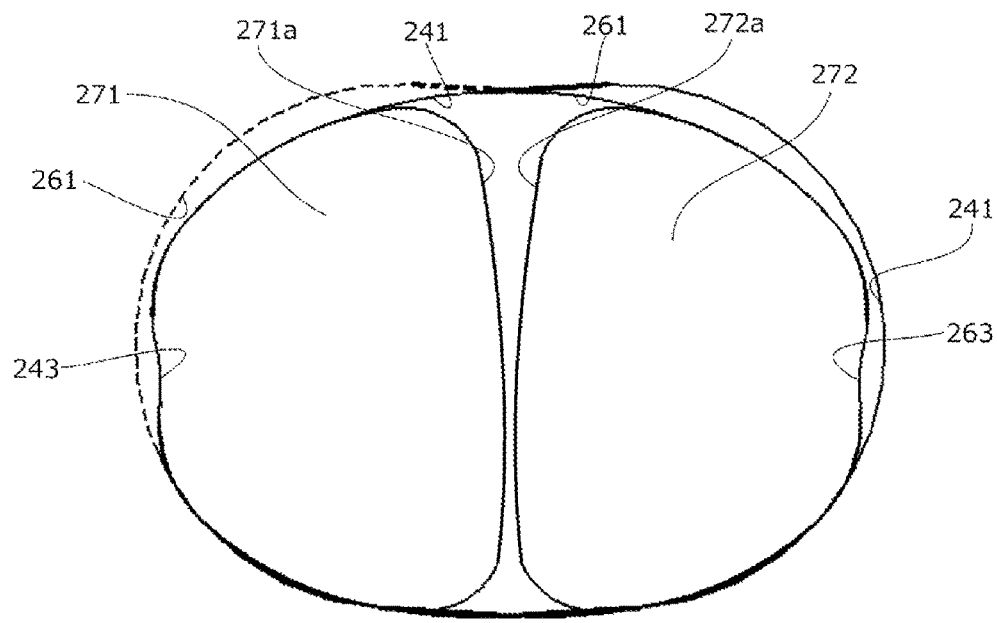
FIG. 6 is an enlarged view of a relationship between a pin hole and a locker pin of a silent chain according to a second embodiment of the present invention.
FIG. 7 is a relational table of respective pitches of a conventional silent chain transmission device.

As shown in FIG. 6, in a silent chain according to a second embodiment of the present invention, a diameter of pin holes 241 and 261 of a middle plate and inner plates in the chain longitudinal direction are set larger than a diameter of the pin holes 241 and 261 thereof in a chain height direction, and sectional shapes of a long pin 271 and a short pin 272 are set thicker in the chain longitudinal direction.

In addition, in a similar manner to the first embodiment, in a state where the pair of locker pins 271 and 272 are in contact with each other on rolling surfaces 271*a* and 272*a*, the pin hole 261 of the inner plate 260 has a size that causes a gap to be created between a seat surface 263 of the inner plate 260 and the back surface of the short pin 272, and the pin hole 241 of the middle plate 240 has a size that causes a gap to be created between a seat surface 243 of the middle plate 240 and the back surface of the long pin 271.

In other words, as shown in FIG. 6, a configuration is adopted in which a gap is created between the rolling surfaces 271*a* and 272*a* in a state where the back surface of the short pin 272 is seated on the seat surface 263 of the inner plate 260 and the back surface of the long pin 271 is seated on the seat surface 243 of the middle plate 240.

Moreover, since other parts of the configuration of the silent chain according to the second embodiment are similar to those of the first embodiment, FIG. 6 only illustrates an enlarged view of a relationship between the pin holes and the locker pins.

By adopting such a configuration, since the same working effect as the silent chain 110 according to the first embodiment can be obtained and, at the same time, gaps formed above and below the seat surfaces 263 and 243 can be reduced when gaps form between the seat surface 263 and the short pin 272 and between the seat surface 243 and the long pin 271, play of the middle plate and the inner plate in the chain height direction decreases, chain behavior during chain travel is stabilized, an occurrence of tooth skipping is suppressed, and a string vibration sound and a meshing noise are reduced.

Moreover, specific relationships regarding dimensions and shapes that enable a dimensional relationship between pin holes and locker pins and a pitch relationship among respective members according to the present embodiment to be set can be configured in a similar manner to the specific examples of the first embodiment described earlier.

While embodiments of the present invention have been described above in detail, it is to be understood that the present invention is not limited to the embodiments described above and that various design changes can be made without departing from the spirit and scope of the invention as set forth in the appended claims.

For example, while a pitch between rolling points is set equal to a sprocket pitch in both a non-guide row and a guide row in a state where a silent chain is wound around a sprocket in a low load state in the embodiments described above, the pitch between rolling points may be set equal to the sprocket pitch only in the non-guide row.

What is claimed is:

1. A silent chain in which a guide row made up of a pair of left and right guide plates and a middle plate disposed between the pair of left and right guide plates and a non-guide row made up of a plurality of inner plates are alternately connected in a chain longitudinal direction by a pair of locker pins made up of a long pin and a short pin to be inserted into a pair of front and rear pin holes provided on the middle plate and the inner plates, wherein
    each locker pin includes a back surface and a rolling surface,
    the pin holes of the inner plates each include a seat surface which is formed on the outer side in the chain longitudinal direction and to which the back surface of the short pin is seated to restrict pin attitude,
    the pin holes of the inner plates and the pair of locker pins are formed in such a size that a gap is formed between the seat surface of the inner plates and the back surface of the short pin in a state where the pair of locker pins are in contact with each other on the rolling surfaces,
    the pin holes of the middle plate each include a seat surface which is formed on the outer side in the chain longitudinal direction and to which the back surface of the long pin is seated to restrict pin attitude, and
    the pin holes of the middle plate and the pair of locker pins are formed in such a size that a gap is formed between the seat surface of the middle plate and the back surface of the long pin in a state where the pair of locker pins are in contact with each other on the rolling surfaces.

2. The silent chain according to claim 1, wherein a thickness of the short pin in the chain longitudinal direction differs from a thickness of the long pin in the chain longitudinal direction.

3. The silent chain according to claim 1, wherein a diameter of the pin holes of the middle plate and the inner plates in the chain longitudinal direction is larger than a diameter of the pin holes thereof in a chain height direction.

4. A silent chain transmission device comprising the silent chain according to claim 1 and a sprocket, wherein
    a pitch between rolling points of locker pins of the front and rear pin holes of the non-guide row is set equal to or longer than a sprocket pitch in a state where the silent chain is wound around the sprocket under a low load.

5. The silent chain transmission device according to claim 4, wherein a pitch between rolling points of locker pins of the front and rear pin holes of the guide row is set equal to the sprocket pitch in a state where the silent chain is wound around the sprocket under a low load.

6. The silent chain transmission device according to claim 4, wherein positions of the front and rear pin holes of the non-guide row differ from positions of the front and rear pin holes of the guide row.

7. The silent chain transmission device according to claim 4, wherein a pitch between rolling points of locker pins of the front and rear pin holes of the non-guide row differs from a pitch between rolling points of locker pins of the front and rear pin holes of the guide row.

* * * * *